US007313756B2

(12) United States Patent
Panditharadhya et al.

(10) Patent No.: US 7,313,756 B2
(45) Date of Patent: Dec. 25, 2007

(54) SCHEMA EDITOR EXTENSIONS

(75) Inventors: Nagalinga Durga Prasad Sripathi Panditharadhya, Redmond, WA (US); Udaya Kumar Bhaskara, Redmond, WA (US); John David Ballard, Woodinville, WA (US); Alvaro de Matos Miranda Filho, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 10/736,333

(22) Filed: Dec. 15, 2003

(65) Prior Publication Data

US 2005/0132276 A1 Jun. 16, 2005

(51) Int. Cl.
*G06F 15/00* (2006.01)
(52) U.S. Cl. ...................................... 715/512; 715/513
(58) Field of Classification Search ............. 715/501.1, 715/513, 512
See application file for complete search history.

(56) References Cited

U.S. PATENT DOCUMENTS

| | | | | |
|---|---|---|---|---|
| 4,710,763 | A * | 12/1987 | Franke et al. ................... 345/10 |
| 5,353,401 | A | 10/1994 | Iizawa et al. ................ 395/161 |
| 5,495,567 | A | 2/1996 | Iizawa et al. ................ 395/161 |
| 5,838,965 | A | 11/1998 | Kavanagh et al. ........... 395/614 |
| 6,898,604 | B1 * | 5/2005 | Ballinger et al. ............. 707/101 |
| 6,980,963 | B1 * | 12/2005 | Hanzek ............................ 705/26 |
| 2002/0059425 | A1 * | 5/2002 | Belfiore et al. .............. 709/226 |
| 2002/0107917 | A1 * | 8/2002 | Pociu .......................... 709/203 |
| 2002/0111924 | A1 * | 8/2002 | Lewis .......................... 705/413 |
| 2003/0140308 | A1 * | 7/2003 | Murthy et al. ............... 715/500 |
| 2004/0073870 | A1 * | 4/2004 | Fuh et al. .................... 715/513 |
| 2004/0088332 | A1 * | 5/2004 | Lee et al. .................... 707/200 |
| 2004/0098667 | A1 * | 5/2004 | Atkinson ..................... 715/513 |
| 2004/0148612 | A1 * | 7/2004 | Olsen .......................... 719/328 |
| 2004/0153171 | A1 * | 8/2004 | Brandt et al. ................... 700/9 |
| 2004/0172594 | A1 * | 9/2004 | Jones et al. .................. 715/512 |
| 2004/0177094 | A1 * | 9/2004 | Jacobs et al. ............. 707/104.1 |
| 2004/0215600 | A1 * | 10/2004 | Aridor et al. ................... 707/3 |
| 2004/0268240 | A1 * | 12/2004 | Vincent, III ................. 715/513 |
| 2005/0050056 | A1 * | 3/2005 | Idicula et al. ............... 707/100 |
| 2005/0102612 | A1 * | 5/2005 | Allan et al. .................. 715/513 |
| 2005/0114405 | A1 * | 5/2005 | Lo .............................. 707/200 |
| 2005/0125720 | A1 * | 6/2005 | Little et al. .................. 715/513 |
| 2005/0138553 | A1 * | 6/2005 | Ballard et al. ............... 715/530 |
| 2005/0177805 | A1 * | 8/2005 | Lynch et al. ................. 715/968 |
| 2005/0256965 | A1 * | 11/2005 | Hohmann et al. ........... 709/230 |
| 2006/0117250 | A1 * | 6/2006 | Rothschiller et al. ....... 715/513 |
| 2006/0259638 | A1 * | 11/2006 | Pociu .......................... 709/232 |
| 2007/0067323 | A1 * | 3/2007 | Vandersluis ................. 707/100 |

OTHER PUBLICATIONS

Skonnard, .Net XML Best Practices—Choosing an XML API, Google Jul. 16, 2003, pp. 1-11.*

(Continued)

*Primary Examiner*—Cong-Lac Huynh
(74) *Attorney, Agent, or Firm*—Woodcock Washburn LLP (57) ABSTRACT

A method of providing an extension mechanism to an schema editor such that custom properties may be defined for nodes within an XSD schema. The custom properties allow the schema editor to define characteristics of non-XML data within XSD schemas in a standard fashion. The XSD schemas may then be used to parse and validate instance data that is not natively in XML format, such as flat files.

21 Claims, 8 Drawing Sheets

OTHER PUBLICATIONS

Ives et al., An XML Query Engine for Network-Bound Data, Google Dec. 13, 2002, pp. 380-402.*

Kane et al., Consistently Updating XML Documents Using Incremental Constraint Check Queries, ACM 2002, pp. 1-8.*

Glushko et al., Document Engineering for e-Business, ACM 2002, pp. 42-48.*

Ye et al., Data Extraction and Transformation with Flat File for Business Integration, Google Search, ICEIS 2004, pp. 643-646.*

"Converting Flat File Content into XML and Vice Versa", XML 99, Philadelphia, Dec. 1999, http://www.infoloom.com/gcaconfs/WEB/philadelphia99/lyons.HTM, 12 pages.

U.S. Appl. No. 10/721,663, filed Nov. 25, 2003, Lun-Lo, W.

* cited by examiner

SCHEMA EDITOR EXTENSIONS

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright © 2003, Microsoft Corporation, All Rights Reserved.

FIELD OF THE INVENTION

This invention relates in general to the field of XML schema editors. More particularly, this invention relates to a system and method of providing schema editor extensions to incorporate XSD annotations into an XSD schema to define non-XML data.

BACKGROUND OF THE INVENTION

More and more businesses are exchanging data and processing documents electronically. This creates problems as electronic documents may have may different and often incompatible formats due to requirements of legacy backend systems. One solution to this problem is to ensure that all documents are of a particular type, for example Extensible Markup Language (XML). Extensible Markup Language (XML) and XML-based schema languages enable one to describe and exchange structured information between collaborating applications or business partners in a platform and middleware-neutral manner. As a result, many industry initiatives have started to adopt XML and XML-based schema languages to specify both their vocabularies and content models. These schemas are becoming widely published and implemented to facilitate communication between both applications and businesses.

However, it is often not possible to convert or upgrade systems to operate using XML. Many proprietary systems cannot be updated in a cost effective manner, resulting in interoperability issues. A solution to this problem is found in the BizTalk Server, available from Microsoft Corporation of Redmond, Wash., which addresses these interoperability challenges in a platform and technology-neutral manner. It provides specifications for the design and development of XML-based messaging solutions for communication between applications and organizations. BizTalk is capable of receiving documents submitted through a wide variety of media, such as HTTP, SMTP, and SOAP; as e-mail attachments; through the message bus; programmatically through exposed APIs; and through adapter components. The BizTalk Server receive functions monitor HTTP, MSMQ message queues, and file locations for incoming business documents. The receive functions are responsible for submitting the received documents on to a processing pipeline, the second step in the process.

A BizTalk Server processing pipeline is set up to receive incoming documents that conform to a specific document definition, which defines the ordering of the business data within the document. When the document arrives through a receive function, a processing pipeline can log the whole document or any portion of it to the BizTalk Document Tracking database for later analysis, or transform the document to conform to the schema of the target application. After documents are received and mapped to the format of the target application, they are delivered either directly to that application or to a business process that manages delivery to multiple target applications.

However, with all the functionality that BizTalk offers, it does not provide a simple method of allowing third parties to define and modify XML schemas (e.g., XSD) to represent non-XML data, such as, flat files, EDI files, X12 files, etc. that may be received by the server. The present invention provides such a solution.

SUMMARY OF THE INVENTION

The present invention is directed to systems and methods for annotating an XML schema to describe a non-XML data stream containing input data to create an XML instance. According to one aspect of the invention, there is a method provided that comprises: including nodes within the XML schema to define characteristics of the non-XML data stream; receiving the non-XML data stream; parsing the non-XML data in accordance with information contained in the nodes; and creating the XML instance containing the input data.

According to one feature of the invention, the method further includes defining, in the XML schema, delimiters, TagNames, positional information within the non-XML data stream. According to another feature, the method further includes annotating the XML schema with the nodes in accordance with standard conventions applicable to an XSD schema. The non-XML data may be flat files, EDI files, X12 files, or COBOL files.

According to another aspect of the invention, there is provided an editor for defining an XML schema that describes a non-XML data stream. The editor includes an instance tree view, a text view of the XML schema, and a properties view. Properties associated with the non-XML data stream are entered via the properties view to define characteristics of data contained within the non-XML data stream, and the properties are annotated within the XML schema.

According to a feature of the invention, the text view further comprises a color-coded view of a portion of the XML-schema associated with a particular node. In addition, the specific properties comprise XSD properties.

According to another feature, the editor includes an extensibility mechanism wherein the properties for specific nodes associated with differing types of non-XML data are specified. The editor may include a custom view for adding properties to each node that appear in the properties view. In addition, the editor may include a validation mechanism and an instance generation mechanism. The schema may be validated from a non-XML perspective and sample instance data is generated from the XML schema containing data from the non-XML data stream.

According to another aspect of the invention, there is disclosed a method of providing schema editor extensions to a schema editor. The method includes providing assemblies containing implementation to extend a functionality of the schema editor; and referencing definitions of interfaces for exposing extended functionalities to the schema editor.

According to a feature of the invention, extended functionalities include additional properties added to elements and attributes of an XML schema. A property manager may be provided that implements an interface to define custom properties for the elements and attributes.

According to another feature, the custom properties are stored within the XML schema. As such, the XML schema may be annotated to describe non-XML data streams. A validator may be provided to validate the custom properties and an instance generator provided for generating an instance of the XML schema.

According to another feature, the method includes annotating a schema being edited by the schema editor to include information about the extended functionalities.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
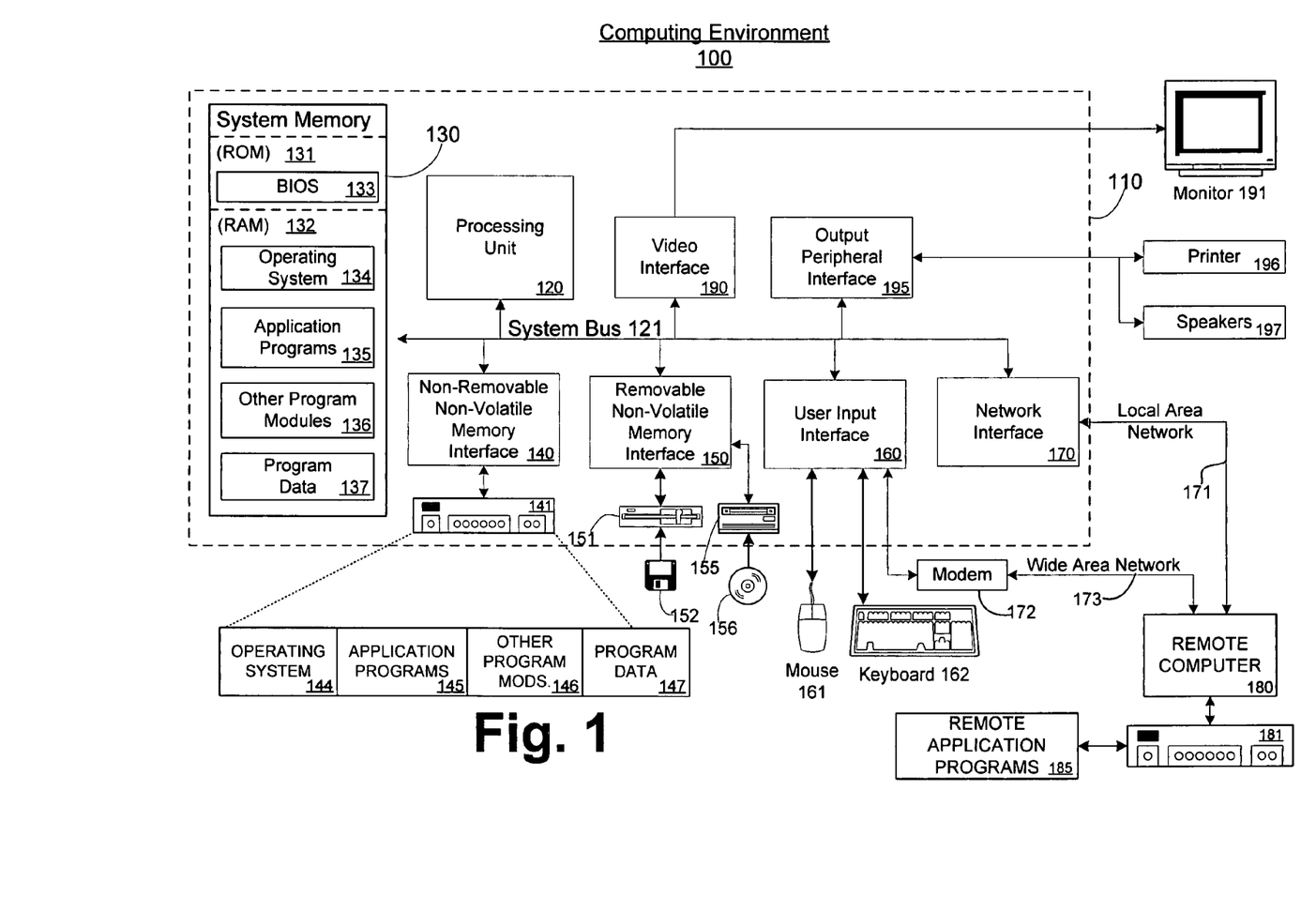
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Schema and Schema Editor Extensions

As many systems are being developed that receive and process XML, there is a growing need to convert streams of non-XML data (e.g., flat file text) to XML instances such that the data can further processed by systems that work with XML data. The present invention is directed to XSD schema specifications and a novel method for defining non-XML file formats within the schema in a standard fashion via a schema editor extension mechanism. XSD is a standard used to describe XML instances. More information regarding XSD may be found in the "XML Schema Part 0: Primer W3C Recommendation, 2 May 2001," which is incorporated herein by reference in its entirety. More information regarding XML can be found in the "Extensible Markup Language (XML) 1.0 (Second Edition) W3C Recommendation 6 Oct. 2000," authored by Tim Bray, Jean Paoli, C. M. Sperberg-McQueen, Eve Maler, which is incorporated herein by reference in its entirety.

Thus, in accordance with the present invention, the following stream of flat file text may be parsed by an XML-based system:

BillingAddress 1661 40$^{th}$ Street,Bellevue,98050;ShippingAddress 1501 20$^{th}$ Street,Renton,81020

In the above stream, the BillingAddress may be considered as a TagName that describes what will follow in the text stream. The remainder of the stream is broken down into three parts separated by a delimiter "," (comma). One of ordinary skill in the art will recognize that other delimiters may be used (e.g., tab, white space, semicolon, etc). Similarly, ShippingAddress is a TagName that describes what the remainder of the text stream may contain. The ";" delimiter (semicolon) is used as a delimiter between these two tags: BillingAddress and ShippingAddress.

Based on this information it is possible to convert this flat file stream to the following XML data, which is easier for systems to recognize and parse.

```
<ns0:PO xmlns:ns0="http://PurchaseOrder">
    <BillingAddress>
        <Street>1661 40th Street</Street>
        <City> Bellevue </City>
        <ZipCode>98050</ZipCode>
    </BillingAddress>
    <ShippingAddress>
        <Street>1501 20th Street</Street>
        <City>Renton</City>
        <ZipCode>81020</ZipCode>
```

-continued

```
        </ShippingAddress>
    </ns0:PO>
```

The above XML data can be effectively described by a schema definition language, such as XSD. Accordingly, the following XSD schema effectively describes the XML above.

```
<xs:schema xmlns="http://PurchaseOrder"
xmlns:b="http://schemas.microsoft.com/BizTalk/2003"
targetNamespace="http://PurchaseOrder"
xmlns:xs="http://www.w3.org/2001/XMLSchema">
    <xs:element name="PO">
        <xs:complexType>
            <xs:sequence>
                <xs:element name="BillingAddress" type="AddrType" />
                <xs:element name="ShippingAddress" type="AddrType" />
            </xs:sequence>
        </xs:complexType>
    </xs:element>
    <xs:complexType name="AddrType">
        <xs:sequence>
            <xs:element name="Street" type="xs:string" />
```

-continued

```
            <xs:element name="City" type="xs:string" />
            <xs:element name="ZipCode" type="xs:string" />
        </xs:sequence>
    </xs:complexType>
</xs:schema>
```

However, the above XSD only describes a flat file stream that has already been converted into XML. It does not contain any information about how to parse a flat file stream and to convert it into XML data. The schema also does not define what delimiter in the flat file stream is used, and at what places in the file it will appear, nor does it define the Tags to look for in the stream. In accordance with the present invention, by annotating the XSD schema with extra annotations at various places, it is possible to parse a flat file stream with this schema.

For example at the PO element level, the schema may specify that a flat file stream is to be parsed and a semicolon will be used as a delimiter for its children BillingAddress and ShippingAddress. Also, at the BillingAddress and ShippingAddress level, may be specified as using a comma as the delimiter to delimit their children such as Street, City and ZipCode.

```
<xs:schema xmlns="http://PurchaseOrder"
xmlns:b="http://schemas.microsoft.com/BizTalk/2003"
targetNamespace="http://PurchaseOrder"
xmlns:xs="http://www.w3.org/2001/XMLSchema">
    <xs:annotation>
        <xs:appinfo>
            <schemaEditorExtension:schemaInfo namespaceAlias="b"
standardName="Flat File"/>
            <b:schemaInfo standard="Flat File" count_positions_by_byte="false" />
        </xs:appinfo>
    </xs:annotation>
    <xs:element name="PO">
        <xs:annotation>
            <xs:appinfo>
                <b:recordInfo structure="delimited" child_delimiter_type="char"
child_delimiter=";" />
            </xs:appinfo>
        </xs:annotation>
        <xs:complexType>
            <xs:sequence>
                <xs:element name="BillingAddress" type="AddrType">
                    <xs:annotation>
                        <xs:appinfo>
                            <b:recordInfo tag_name="BillingAddress" structure="delimited"
child_delimiter_type="char" child_delimiter="," />
                        </xs:appinfo>
                    </xs:annotation>
                </xs:element>
                <xs:element name="ShippingAddress" type="AddrType">
                    <xs:annotation>
                        <xs:appinfo>
                            <b:recordInfo tag_name="ShippingAddress"
structure="delimited" child_delimiter_type="char" child_delimiter="," />
                        </xs:appinfo>
                    </xs:annotation>
                </xs:element>
            </xs:sequence>
        </xs:complexType>
    </xs:element>
    <xs:complexType name="AddrType">
        <xs:sequence>
            <xs:element name="Street" type="xs:string" />
            <xs:element name="City" type="xs:string" />
            <xs:element name="ZipCode" type="xs:string" />
```

-continued

```
    </xs:sequence>
   </xs:complexType>
</xs:schema>
```

The above XSD schema is an annotated version that describes the delimiters, etc. at different levels of the schema. Thus, in accordance with the present invention, any non-XML stream can be described using XML schemas decorated with stream specific properties at different levels in the schema. Although the present invention has been described with regard to flat file streams, where delimiters, TagNames, positional information, etc., is used, the present invention is not limited to such non-XML streams.

As the complexity of a non-XML stream grows, so does the description of it in the XSD schema language. For example, ComplexType definitions, etc., may potentially span across multiple schemas. Add to that, the complexity of managing these custom annotations at different levels in the schema. Together it becomes almost impossible to visualize the kind of non-XML stream that this XSD schema is going to represent. Hence, it becomes extremely difficult for the user to create and edit such XSD schemas which can be used to describe non-XML file formats if he/she were to do it by hand in some text editor.

In accordance with the present invention, a simple hierarchical representation of the non-XML stream that a XSD schema represents is provided within a user interface, as well as an intuitive way of adding non-XML stream specific properties for each node. A preferred editor is the BizTalk Schema Editor available from Microsoft Corporation of Redmond, Wash.

Figure 2:
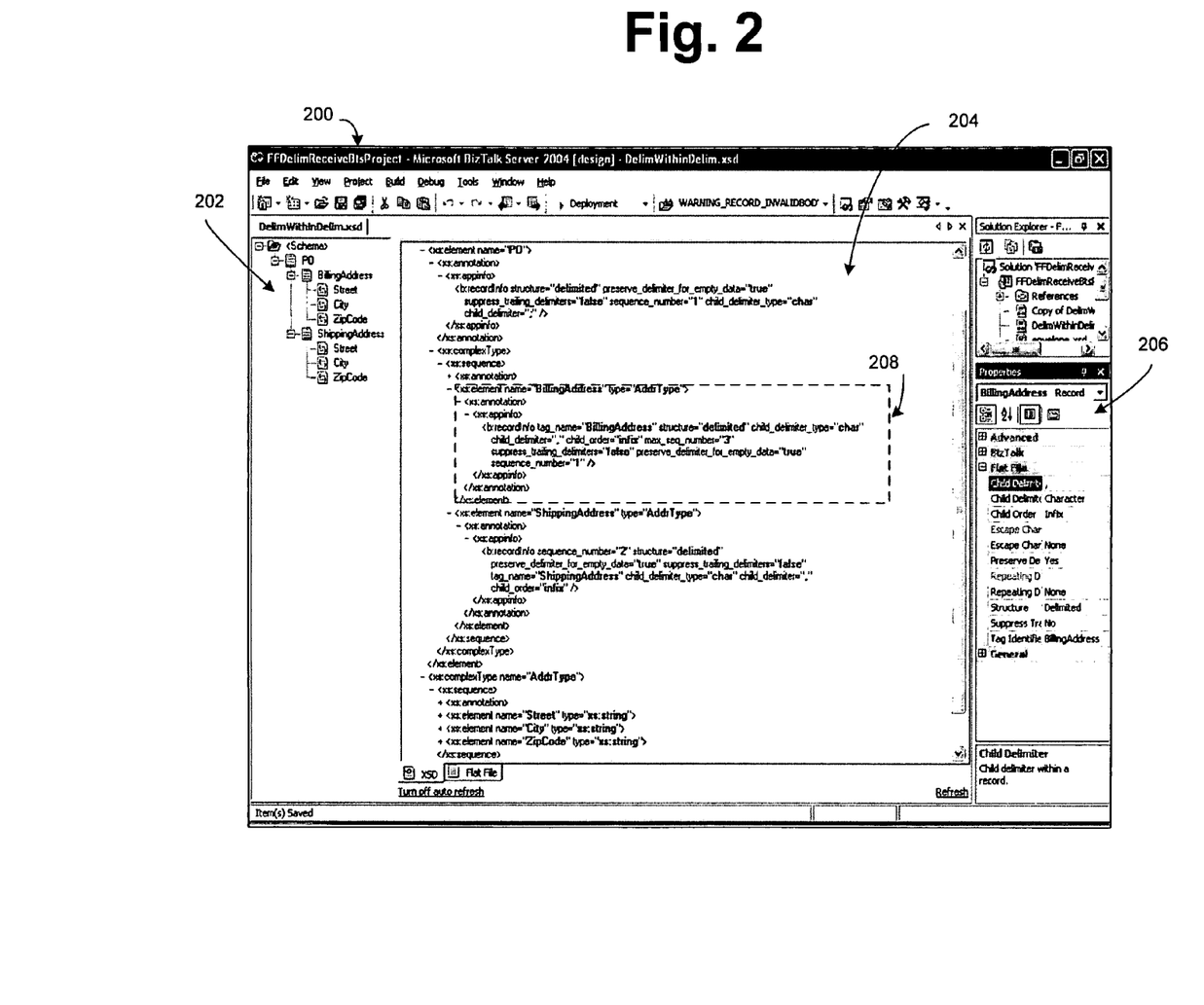
FIGS. 2-4 are illustrative user interfaces of a schema editor showing the XSD schema describing the XML with embedded flat file annotations.

Referring now to FIG. 2, illustrates an exemplary Schema Editor 200 displaying the XSD schema with embedded flat file annotations. This editor is preferably hosted inside Microsoft Visual Studio.NET (referred to as VS.NET) and comprises the BizTalk Schema Editor. The editor 200 consists of three main parts: (a) the left portion of the figure shows the Instance Tree View 202 representation of the schema, (b) the middle pane 204 which shows the text view of the schema, and (c) the bottom right corner which shows the Properties window 206 and the properties of a schema tree node selected in the Tree View 202. The middle pane includes a color-coded 208 representation of the text content of the XSD schema above. The Instance Tree View 202 shown in this figure is similar to the instance XML described. BizTalk exposes the XSD schema to the user in the form a simple hierarchical Instance Tree View. Each of the stream specific properties are exposed to the user as the properties of the corresponding XSD Tree Node in the VS.NET property browser.

Figure 3:
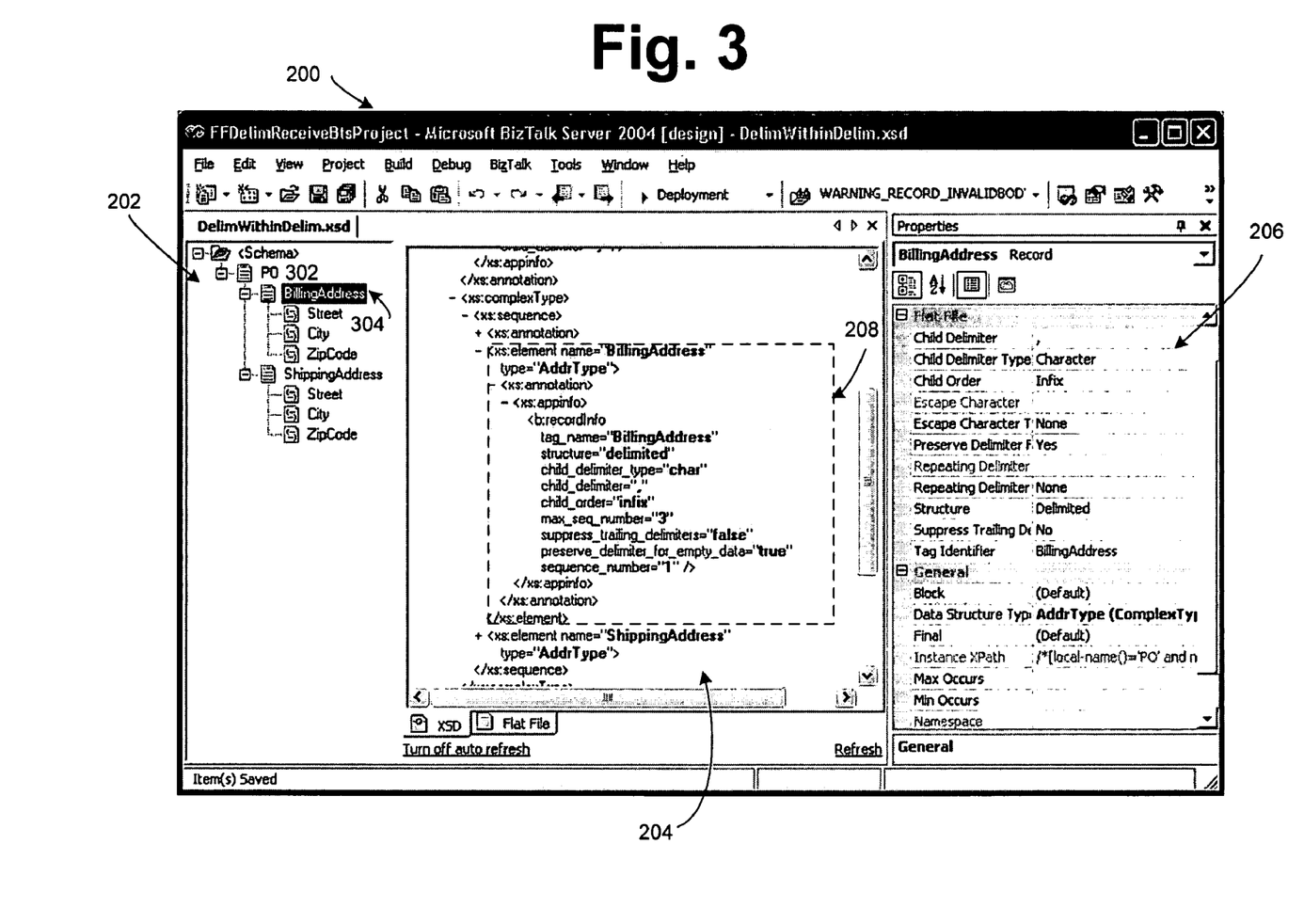

Referring to FIG. 3, there is shown the node PO 302 and the node BillingAddress 304 in focus. The VS.NET property browser 206 is showing flat file specific properties for this node, wherein the Structure property is set to delimited, and the TagIdentifier property is set to BillingAddress. Also for this node, the Child Delimiter property has been set to ',' (comma). In the property browser along with the Flat file specific properties, there are other properties in the general category such as Block, Data Structure Type, Max Occurs, Min Occurs. These are standard XSD related properties for defining any XML document. Thus, in accordance with an advantageous aspect of the invention, the user can edit XML as well as non-XML properties side by side seamlessly when creating the schemas in the BizTalk Schema Editor 200.

As an end user is constructing a schema in the editor 200, he/she simply creates a simple hierarchical tree structure in the Instance Tree View 202 of the editor. The user then sets flat file specific properties such as Structure, Child Delimiter, Tag Identifier etc. From the user's perspective, these properties are abstract node properties that can he/she can set on a per node basis. The editor 200 in the background converts these properties into annotations that are placed into the text content of the XSD schema, as shown in the middle pane 204 of the editor above for the element BillingAddress in box 208.

Thus, in accordance with the present invention, the BizTalk Schema Editor defines the storage non-XML specific properties in a standard way into an XSD schema in the form of embedded annotations. This allows users to define non-XML standards, such as flat files, using the XSD schema extending the XSD schema in a standard way so it can describe any non-XML data.

The editor also provides a convenient extensibility mechanism through which third-party vendors can add their own set of properties for each node in the schema editor. For example, using the extensibility mechanism provided by the editor, a third party can provide an extension for defining schemas for a non-XML file format such as EDI. Thus, the third party vendor can provide a set of properties that will be relevant for parsing an EDI file. These properties are automatically displayed in the BizTalk Schema Editor on a per node basis in the property browser. When the user modifies these properties, they will be persisted to the XSD schema file using the annotations as defined by the Schema Editor.

Figure 4:
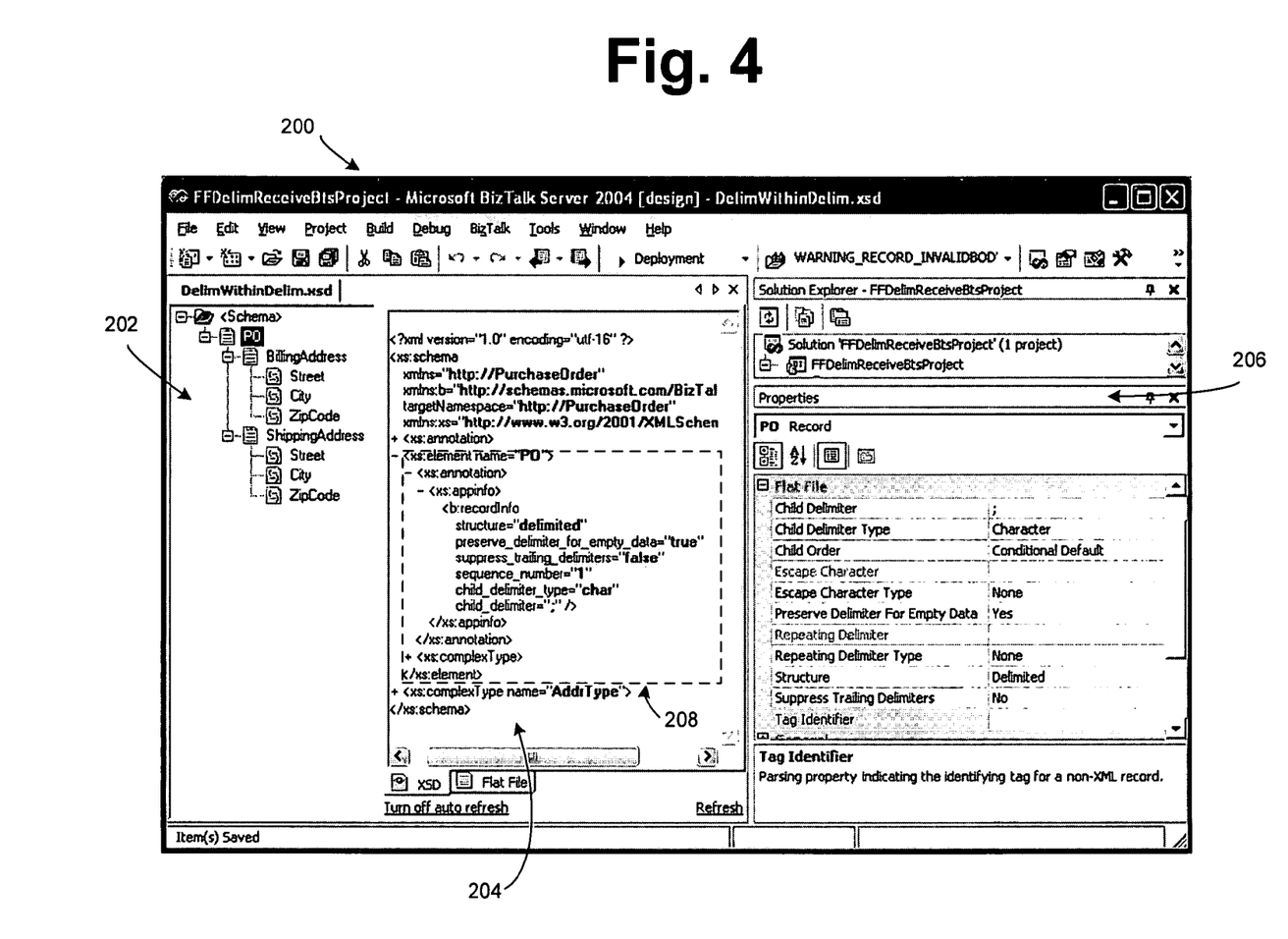

Referring to FIG. 4, the node PO is shown to be in focus. The VS.NET property browser 206 is showing flat file specific properties for this node. The Structure property is set to delimited, and the Child Delimiter property has been set to ';' (semi colon) at the PO node level.

Figure 5:
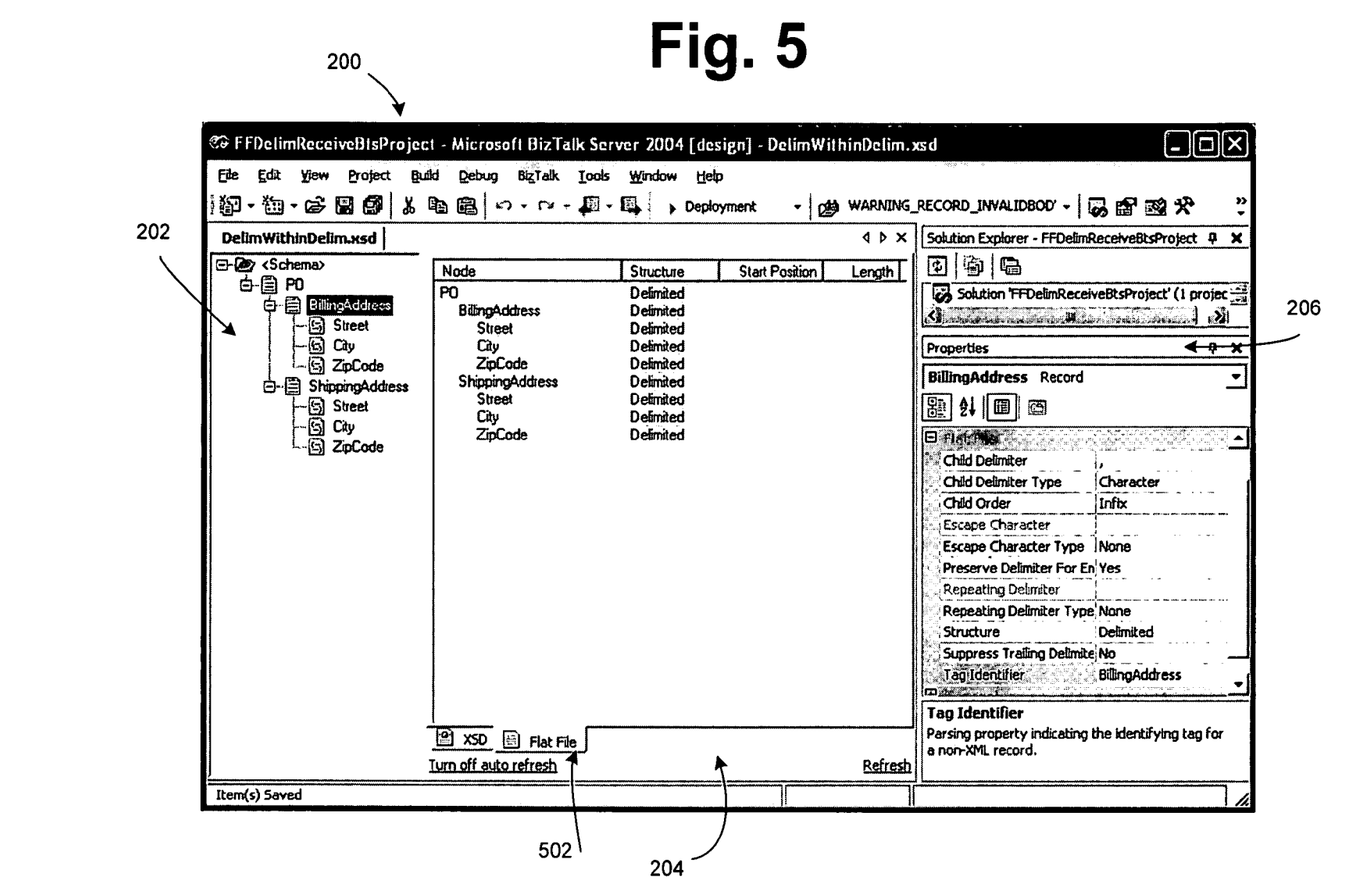
FIG. 5 illustrates the user interface of the schema editor showing a flat file custom view of the XSD schema.

Referring to FIG. 5, a flat file custom view 502 is shown in the middle pane 204 of the editor. The Schema Editor Extensions provide way for third party vendors to add their own custom views to the BizTalk-Schema-Editor, in addition to the text content view that is shown by the editor by default in the middle pane 204. Schema Editor Extensions of the present invention provide the following facilities to the Extension writers: Extensions can add their own custom properties to each node in the schema editor 200 that will appear in the Property Browser 206 on a per node basis. Extensions can add custom views 502 that conform to the non-XML format that the extension addresses.

Further, the end user that creates schemas using these extensions in the BizTalk Schema Editor can perform the following: Generate a sample non-XML instance in the editor based on the extension. Validate the schema he/she is designing for errors and warnings from a non-XML perspective. Validate a sample non-XML instance against the schema he/she is designing.

Figure 6:
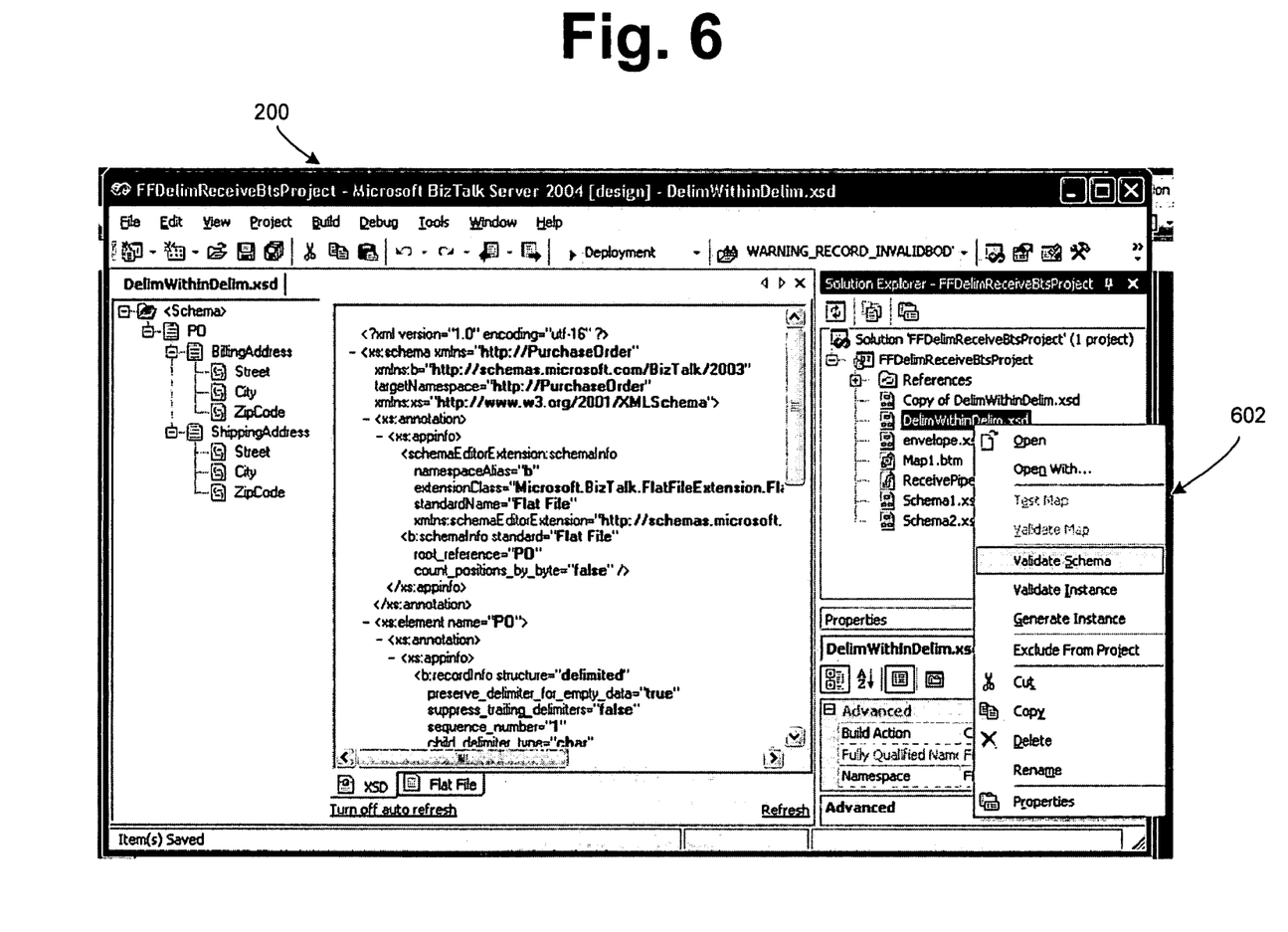
FIG. 6 illustrates the user interface of the schema editor showing a Validate, Generate Facilities.

Referring to FIG. 6, there is illustrated a context menu 602 for performing various actions on the schema such as: Validating the Schema for errors from a non-XML perspective, validating a sample non-XML instance against the schema, and generating a sample non-XML instance out of the schema.

To implement the above in the Schema Editor, the present invention utilizes Schema Editor Extensions that are provided as Microsoft .NET assemblies containing implementation to extend the functionality of the Schema Editor. To be identified as an extension, an assembly must have one class that implements the IExtension interface and should be located under the Developer Tools\SchemaEditorExtensions folder in the BizTalk product installation directory.

The developer of an extension simply has its assembly reference the Microsoft.BizTalk.SchemaEditor. Extensibility.dll, which contains the definition of all the interfaces needed for exposing extended functionality to the Schema Editor. Those interfaces are defined under the Microsoft.BizTalk.SchemaEditor.Extensibility namespace. The IExtension interface is the "entry point" for the extension, from which the framework can get access to all extended functionality (property managers, custom views, schema validation, native instance generation, native instance validation).

Figure 7:
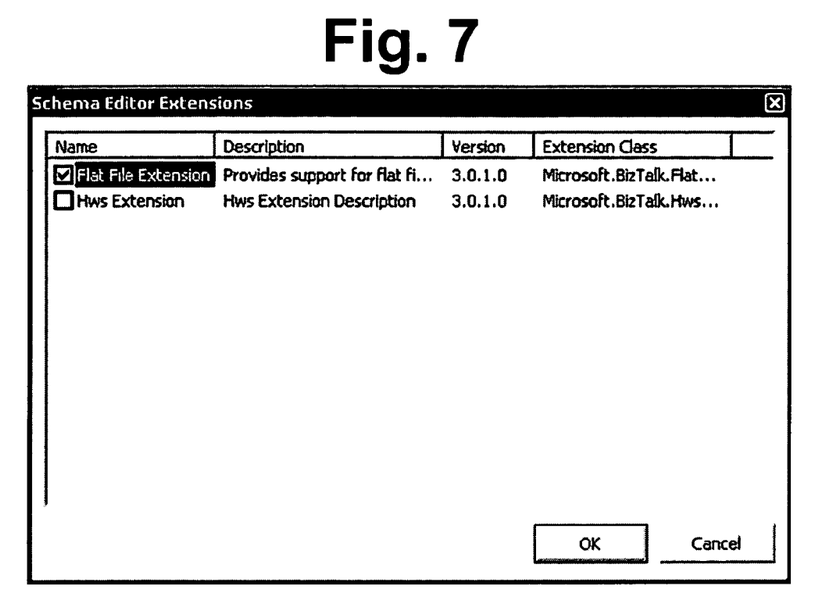
FIG. 7 illustrates the user interface of the schema editor extensions' property in the schema node.

A given schema can have multiple extensions associated to it, but only one can be set as the standard at a given time (in the Standard property of the schema node). The extension currently set as the standard is the one used for native instance generation/validation and schema validation. Extensions can be associated to a given schema by editing the 'Schema Editor Extensions' property in the schema node, which will display the dialog shown in FIG. 7.

The information about the extensions associated to a schema is stored in the schema itself, within the annotation element of the schema element:

```
<xs:schema xmlns:myextension="http://www.extensions.com/
mytestextension"
    xmlns="http://BizTalk_Application_Project11.Schema6"
    elementFormDefault="qualified"
    targetNamespace=http://BizTalk_Application_Project11.Schema6
    xmlns:xs="http://www.w3.org/2001/XMLSchema">
    <xs:annotation>
      <xs:appinfo>
        <_schemaEditorExtension:SchemaInfo
        NamespaceAlias="myextension"
            extensionClass="MyExtension.MyExtension"
        xmlns:_schemaEditorExtension =
        " http://schemas.microsoft.com/BizTalk/2003/
            SchemaEditorExtensions" />
      </xs:appinfo>
    </xs:annotation>
...
```

After instantiating the extension object, the framework invokes IExtension.Initialize, passing an ITree object so that the extension can have access to information on the schema tree. For instance, the extension could traverse all child nodes by accessing the ITree.RootNode property.

Figure 8:
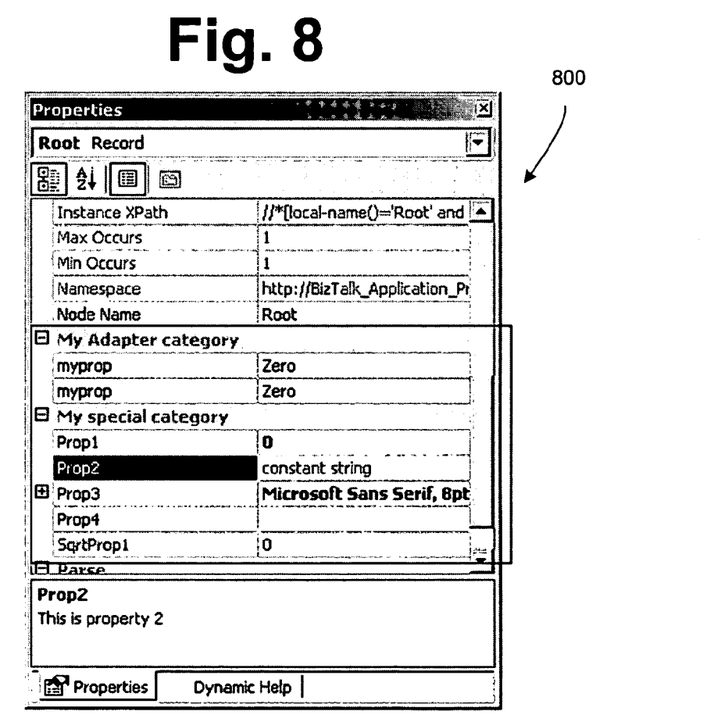
FIG. 8 illustrates the schema editor's property manager user interface.

Referring to FIG. 8, Property Managers 800 allow an extension to add custom properties (as annotations) to elements and attributes in the schema, in addition to the regular XSD properties. A Property Manager is an object that implements the IPropertyManager interface, and is obtained by a call to IExtension.GetPropertyManager (ITreeNode). Typically the extension will provide one property manager object for each ITreeNode object. The property manager object is responsible for the collection of custom properties for that ITreeNode.

A custom property is represented by a System.ComponentModel.PropertyDescriptor object, which can be obtained from the collection returned by IPropertyManager. GetProperties ( ). Having custom properties as PropertyDescriptor objects facilitates the integration with the Property Grid. Custom properties are stored in the xsd document as attributes of an element within the annotation/appinfo of the corresponding ITreeNode object. The custom properties of an ITreeNode object can all be attributes of the same element, or each have its own associated element.

```
<xs:annotation>
  <xs:appinfo>
    <extension-prefix:xml-element-name property-name="raw-value"
...>
  </xs:appinfo>
</xs:annotation>
```

Where:
prefix-prefix: value of IExtension. NamespaceAlias
xml-element-name: value of IPropertyManager.GetXmlElementName(PropertyDescriptor)
property-name: value of PropertyDescriptor.Name
raw-value: value of IPropertyManager.GetRawValue (PropertyDescriptor)
For example:

```
<xs:attribute name="Field3" type="xs:string">
  <xs:annotation>
    <xs:appinfo>
      <myextension:PropertyInfo MyExtensionProp1="0"
      MyExtensionProp2="string val" />
    </xs:appinfo>
  </xs:annotation>
</xs:attribute>
<xs:element name="Record4">
  <xs:annotation>
    <xs:appinfo>
      < myextension:PropertyInfo1 MyExtensionProp1="20" />
      < myextension:PropertyInfo2 MyExtensionProp2="string val" />
    </xs:appinfo>
  </xs:annotation>
  <xs:complexType />
</xs:element>
```

Figure 9:
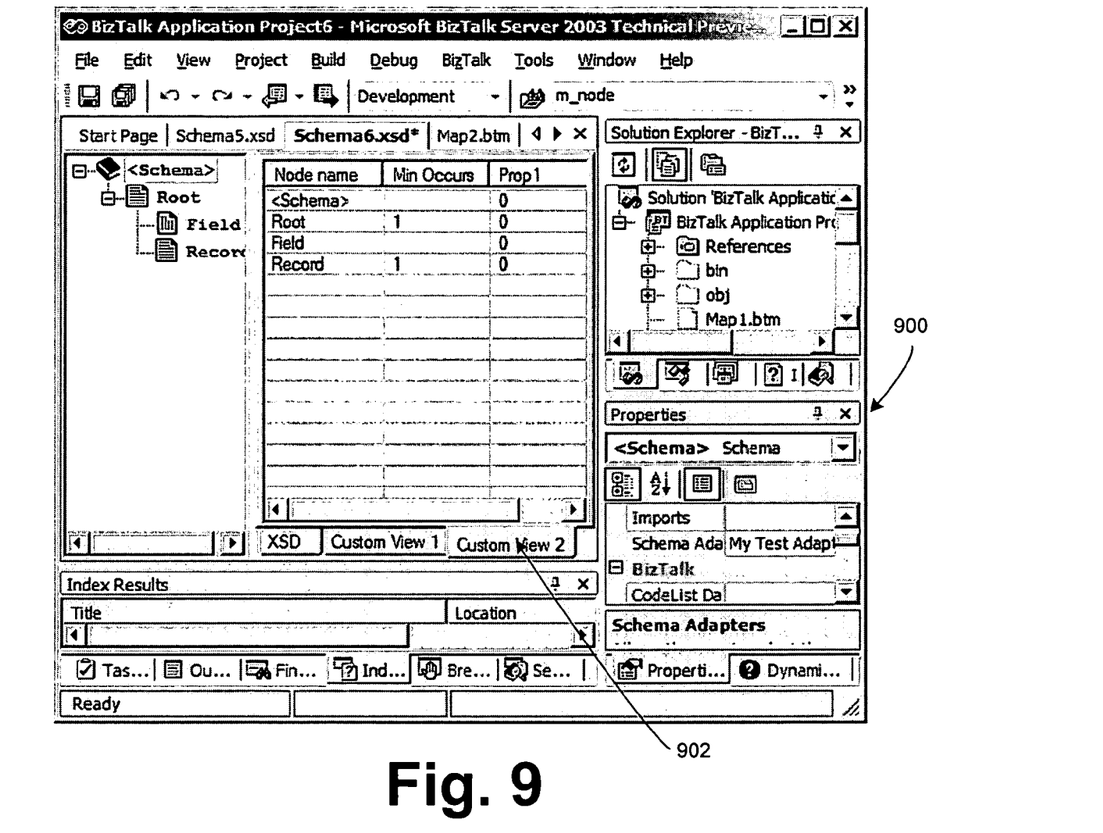
FIG. 9 illustrates the schema editor's custom view user interface.

Referring to FIG. 9, a custom view 902 is typically a read-only window control object (derived from System. Windows.Forms.Control) and is provided by an extension to represent the schema in a custom display format. An extension can implement multiple custom views. An extension does not necessarily have to implement custom views. Custom views are displayed in the schema editor view as tab pages, in addition to the XSD view tab (which is always displayed).

If an extension provides an ISchemaValidator object, the framework invokes ISchemaValidator.ValidateSchema when the user invokes the 'Validate Schema' command, or during compilation when the user builds the project containing the schema. The extension will usually validate the custom properties, and can return error messages as an array of IValidationInfo objects. The error messages will be displayed in the VS Task list, along with errors returned from other extensions and the TOM compiler.

If a given extension is set as the standard, and the 'Create Instance Output Type' property in the schema file property page is set to 'Native', the framework will invoke IInstaceValidator.ValidateInstance, passing the input filename that is specified in 'Input Instance Filename'. Error messages can be returned as an array of IValidationInfo objects, and will get displayed in the VS Task list.

If a given extension is set as the standard, and the 'Create Instance Output Type' property in the schema file property page is set to 'Native', the framework will first generate the XML instance, and then invoke IInstaceGenerator.GenerateInstance, passing the generated XML instance, as well as the output filename that is specified in 'Output Instance Filename'. Error messages can be returned as an array of IValidationInfo objects, and will get displayed in the VS Task list.

Thus, the present invention provides an editor extension mechanism that provides an elegant way of surfacing properties into an XSD schema that can describe any non-XML data while adhering to the standards. Also the present invention provides a way to surface properties when consuming pure XML documents. For example, the XML documents may describe system specific information, which may not be meaningful to be included as part of the XML data (this extra information could be context specific that does not come from the data). Thus, if a user is creating a schema that describes XML data consumed by a SAP human resources (HR) processing system, it may be useful to include some connection string information into this schema as annotations in accordance with the present invention, e.g., the database to be connected to, any user/machine specific information which will help the SAP system better process incoming XML data, etc.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, may be applied to a serialization format other than XML, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of annotating an XML schema to provide information on how to parse a non-XML data stream containing delimiting portions and content portions to create an XML instance from the non-XML data stream, the method comprising:

including delimitation nodes within said XML schema that define delimiting characteristics of said non-XML data stream, where the delimitation nodes are child nodes in the XML schema, where instances of the content nodes in the XML instance are intended to contain the content portions of the non-XML data stream that are delineated by the delimiting portions of the non-XML data stream, the delimiting portions identifiable by the delimiting characteristics of the delimitation nodes;

receiving said non-XML data stream;

parsing said non-XML data in accordance with information contained in said delimitation nodes of the XML schema by matching the delimiting portion of the non-XML data stream with the delimitation nodes to identify the content portions of the non-XML data stream, and generating the instances of the content nodes containing the identified content portions of the non-XML data stream, where instances of content nodes contain respective content portions identified by delimitation nodes of the corresponding content nodes in the XML schema; and creating said XML instance by adding the generated content nodes to the XML instance, where the delimiting portions matched to the delimitation nodes are not included in the XML instance.

2. The method of claim 1, further comprising:
defining, in said XML schema, delimiters, TagNames, positional information within said non-XML data stream.

3. The method of claim 1, further comprising:
annotating said XML schema with said nodes in accordance with standard conventions applicable to an XSD schema.

4. The method of claim 1, wherein said non-XML data comprises at least one of flat files, EDI files, and COBOL files.

5. A computer-readable storage medium having stored thereon computer executable instructions for defining an XML schema that describes a non-XML data stream, comprising:

an instance tree view;

a text view of said XML schema; and a properties view;

wherein to construct a schema, a user creates a simple hierarchical tree structure in the instance view and the properties associated with said non-XML data stream are entered via said properties view to define characteristics of data contained within said non-XML data stream, where the properties are expressed as delimitation nodes within said XML schema that define delimiting characteristics of said non-XML data stream, where the delimitation nodes are child nodes in the XML schema, where instances of content nodes in an XML instance are intended to contain content portions of the non-XML data stream that are delineated by delimiting portions of the non-XML data stream, where instances of content nodes contain respective content portions identified by delimitation nodes of corresponding content nodes in the XML schema, and where delimiting portions matched to delimitation nodes are not included in the XML instance.

6. The computer-readable medium of claim 5, wherein said text view further comprises a color-coded view of a portion of said XML-schema associated with a particular node.

7. The computer-readable medium of claim 5, wherein said specific properties comprise XSD properties.

8. The computer-readable medium of claim 5, having further computer executable instructions for maintaining an extensibility mechanism wherein said properties for specific nodes associated with differing types of non-XML data are specified.

9. The computer-readable medium of claim 8, having further computer executable instructions for maintaining a custom view for adding properties to each node that appear in said properties view.

10. The computer-readable medium of claim 5, having further computer executable instructions for maintaining a validation mechanism; and an instance generation mechanism.

11. The computer-readable medium of claim 10, wherein said schema is validated from a non-XML perspective.

12. The computer-readable medium of claim 10, wherein sample instance data is generated from said XML schema containing data from said non-XML data stream.

13. A method of providing schema editor extensions to a schema editor, comprising:
providing assemblies containing implementation to extend a functionality of said schema editor;
referencing definitions of interfaces for exposing extended functionalities to said schema editor; and
adding custom properties to elements and attributes in the schema, the custom properties allowing the editor to define characteristics of the non-XML data within the XSD schemas in a standard fashion,
where the custom properties are expressed as delimitation nodes within an XML schema that define delimiting characteristics of said non-XML data, where the delimitation nodes are child nodes in the XML schema, where instances of content nodes in an XML instance are intended to contain content portions of the non-XML data that are delineated by delimiting portions of the non-XML data, where instances of content nodes contain respective content portions identified by delimitation nodes of corresponding content nodes in the XML schema, and where delimiting portions matched to delimitation nodes are not included in the XML instance.

14. The method of claim 13, wherein said extended functionalities include additional properties added to elements and attributes of the XML schema.

15. The method of claim 14, further comprising:
providing a property manager that implements an interface to define custom properties for said elements and attributes.

16. The method of claim 15, further comprising:
storing said custom properties within said XML schema.

17. The method of claim 15, further comprising:
annotating said XML schema to describe non-XML data streams.

18. The method of claim 15, further comprising:
providing a validator to validate said custom properties.

19. The method of claim 15, further comprising:
providing an instance generator for generating an instance of said XML schema.

20. The method of claim 13, further comprising:
annotating a schema being edited by said schema editor to include information about said extended functionalities.

21. A method of using information in an XML schema to parse a non-XML data stream to generate an XML document, the method comprising:
accessing the XML schema, wherein the XML schema comprises named elements that define elements that will contain content data in XML documents generated according to the XML schema, where some of the elements of the XML schema include one or more XML tags comprising delineation definitions; and
matching delineating portions of the non-XML data stream with the delineation definitions in the XML schema to identify portions of content in the non-XML data stream that are delineated by the delineating portions and adding to the XML document XML elements containing the identified portions of content, where the XML elements are instances of the named elements in the XML schema that include the delineation definitions, and where the delineating portions matched to the delineation definitions are not included in the XML document.

* * * * *